H. W. CUMMINGS.
SHOCK ABSORBER FOR VEHICLES.
APPLICATION FILED MAR. 28, 1910.
970,611.
Patented Sept. 20, 1910.
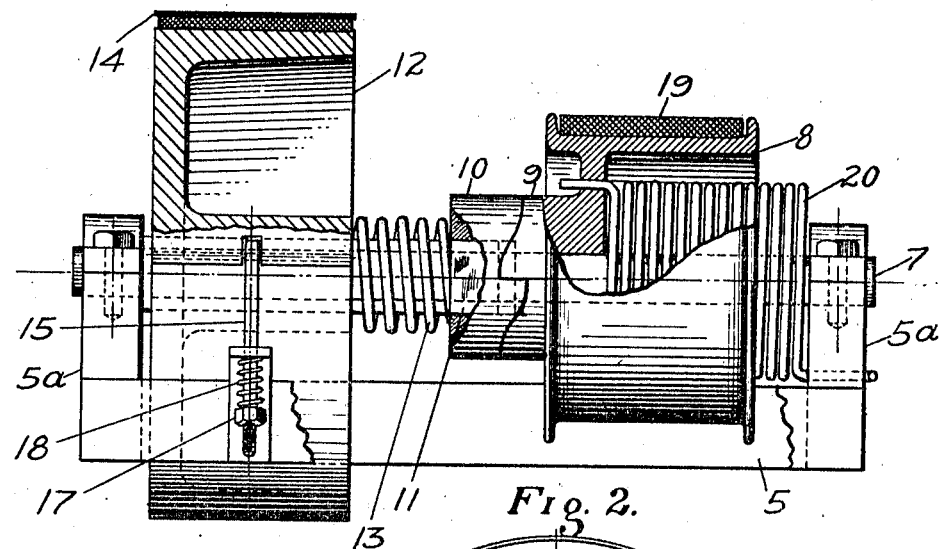
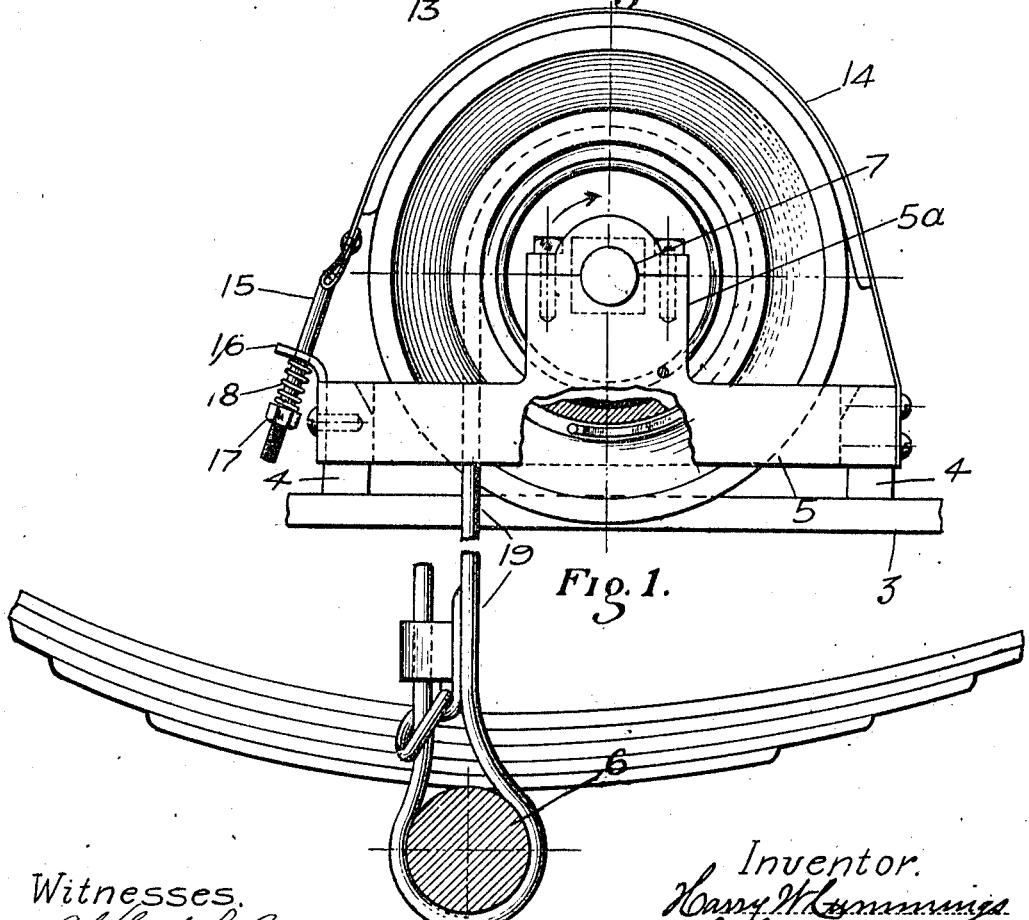

UNITED STATES PATENT OFFICE.

HARRY W. CUMMINGS, OF LOS ANGELES, CALIFORNIA.

SHOCK-ABSORBER FOR VEHICLES.

970,611.   Specification of Letters Patent.   Patented Sept. 20, 1910.

Application filed March 28, 1910. Serial No. 551,961.

*To all whom it may concern:*

Be it known that I, HARRY W. CUMMINGS, a citizen of the United States, residing in the city of Los Angeles, county of Los Angeles, State of California, have invented new and useful Improvements in Shock-Absorbers for Vehicles, of which the following is a specification.

My invention relates to a shock absorber for use upon that class of vehicles in which springs are interposed between the axles of the running gear and the load carrying body; and the object thereof is to prevent an objectionable movement in the recoil of such interposed springs when compressed by reason of the vehicle passing over an obstruction upon, or into or out of a depression in the road over which it is passing.

I accomplish this object by the mechanism described herein and illustrated in the accompanying drawings, in which—

Figure 1 is an end elevation with parts broken away, of my improved shock absorber with a fragment of the vehicle shown partly in elevation and partly in section. Fig. 2 is a side elevation partly in section and partly broken away, of my improved shock absorber detached from the vehicle.

In the drawings I have illustrated my shock absorber as applied to an automobile, and I will describe it as applied to such vehicle, although it may be applied to any other vehicle having springs interposed between the axles of the running gear and the load carrying body.

In the drawings 3 is the metallic frame of the body of the vehicle.

4 are the cross bars secured thereto, to which cross bars is secured the metallic frame 5 of my shock absorber. This frame is preferably placed in the center of the body of the vehicle over the rear axle 6. A nonrevoluble shaft 7 is mounted in lugs 5ª, which lugs are located at the ends of the frame as best shown in Fig. 2. Revolubly mounted upon shaft 7 is the takeup drum 8 which carries on one end thereof one of the members 9 of a clutch. The other member 10 of the clutch is slidably mounted upon a square sleeve 11, which sleeve is revolubly mounted upon shaft 7. If desired sleeve 11 could be round, but in that case member 10 would have to be splined thereon so as to permit of a sliding movement on the sleeve and at the same time prevent it from rotating thereon. A friction or brake drum 12 is rigidly secured upon sleeve 11 at the end opposite member 10. A coil spring 13 surrounds the sleeve between the drum and the clutch member and normally holds member 10 in engagement with member 9. A brake strap 14 is secured at one end to frame 5 and passes over the brake drum and is secured to an adjusting bolt 15 which passes through a lug 16 secured to frame 5. Adjusting bolt 15 is provided with a nut 17, and between the nut and lug is a spring 18, which provides means for securing, in connection with the nut, a yielding tension on the brake strap. Takeup strap 19 has one end thereof secured to the takeup drum and the other end is buckled around the rear axle of the vehicle, or otherwise secured thereto, passing through an aperture of the bed. A retraction spring 20 has one end secured to frame 5 and the other end secured to the takeup drum. This spring causes the takeup drum to revolve and wind thereon the slack of the takeup strap whenever the bed is caused to approach the axles of the vehicle by the machine running over obstructions on the road or into depressions therein. The springs of the vehicle are then prevented from expanding until the brake drum is rotated, thereby preventing any quick rebound of the springs of the auto, as the tension of the brake strap on the brake drum is regulated to such tension as will prevent any sudden rebound.

By this construction it will be observed that I have provided a cheap and efficient shock absorber which holds the springs of the vehicle from the ordinary sudden recoil movement thereof when compressed, and which begins to act to prevent such recoil as soon as the vehicle springs have reached their compression limit caused by the shock of the vehicle running over an obstruction or into a depression. The slowness of the recoil of the vehicle springs will be governed by the amount of tension placed upon the brake strap, the greater the tension the slower the takeup strap unwinds.

I have shown and described my shock absorber as secured upon the body of the vehicle but it is obvious that it could be secured upon the axle of the vehicle and the takeup strap could be secured to the body of the vehicle. In the construction described and claimed herein the vehicle body will be considered as one member of the vehicle and the running gear as the other member of the vehicle.

Having described my invention what I claim is;

1. The combination of a spring supported vehicle body and its running gear, of two revoluble drums carried by one of said members, said drums being mounted side by side upon the same shaft; a clutch mechanism connecting said drums; a flexible connection between one of said drums and the other member of the vehicle; a takeup mechanism carried by said last drum; and a friction mechanism engaging the other drum.

2. The combination with a spring supported body and its running gear, of a frame secured to one of said members; a shaft mounted in said frame; a takeup drum revolubly mounted on said shaft; a takeup band having one end secured to said takeup drum, and the other end secured to the other member; a clutch member secured to said takeup drum; a sleeve revolubly mounted on said shaft; a friction drum mounted on said sleeve; a clutch member slidable on said sleeve and revoluble therewith, said clutch member being adapted to lock with the clutch member on the takeup drum when the drum is revolved in one direction and to snap past when the drum is revolved in the opposite direction; a brake strap having its ends secured to said frame and passing over and in contact with said friction drum, one of said connections being an adjustable yielding connection; means to keep the clutch members normally in engagement; and means to operate the takeup drum to wind the slack of the takeup band thereon upon the compression of the springs.

In witness that I claim the foregoing I have hereunto subscribed my name this 21st day of March, 1910.

HARRY W. CUMMINGS.

Witnesses:
   G. E. HARPHAM,
   S. B. AUSTIN.